March 21, 1950  A. H. JORDAN  2,501,604
RECORDER HAVING A SINGLE MARKER FOR MAKING A
PAIR DISTINGUISHABLE RECORDS Filed Dec. 15, 1944  2 Sheets-Sheet 1

*INVENTOR.*
ARTHUR H. JORDAN

BY
*G. B. Spangenberg*
ATTORNEY

March 21, 1950     A. H. JORDAN     2,501,604
RECORDER HAVING A SINGLE MARKER FOR MAKING A
PAIR DISTINGUISHABLE RECORDS
Filed Dec. 15, 1944     2 Sheets-Sheet 2
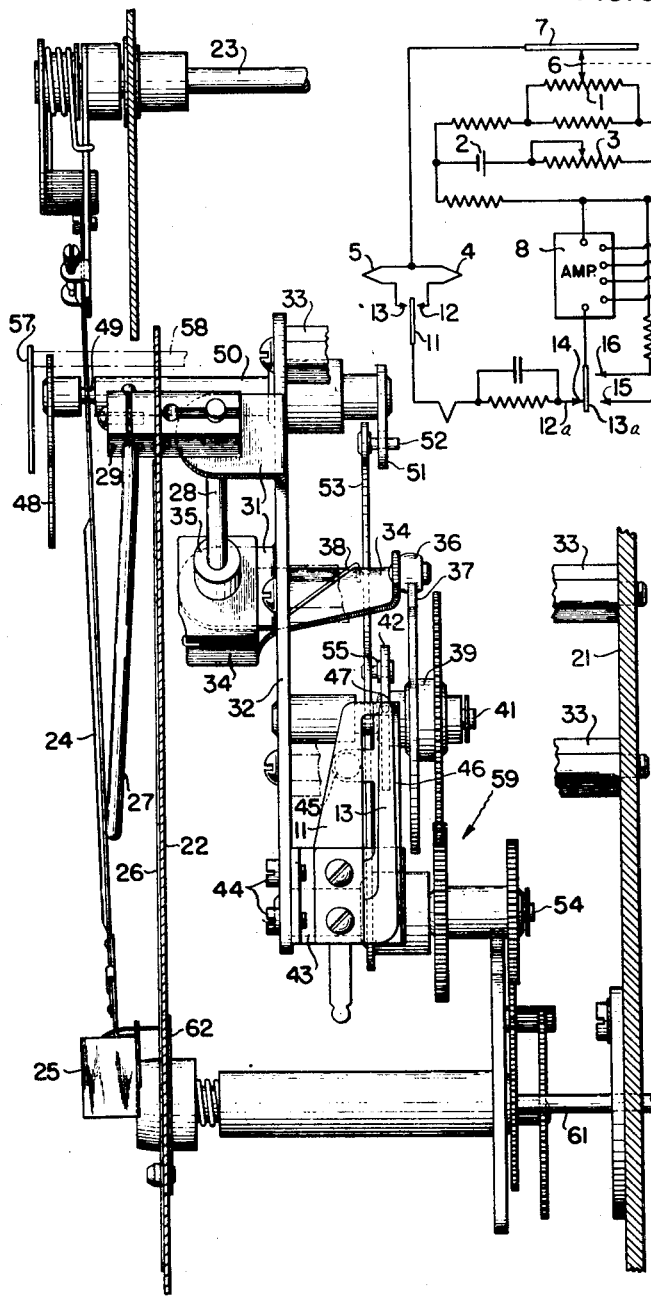
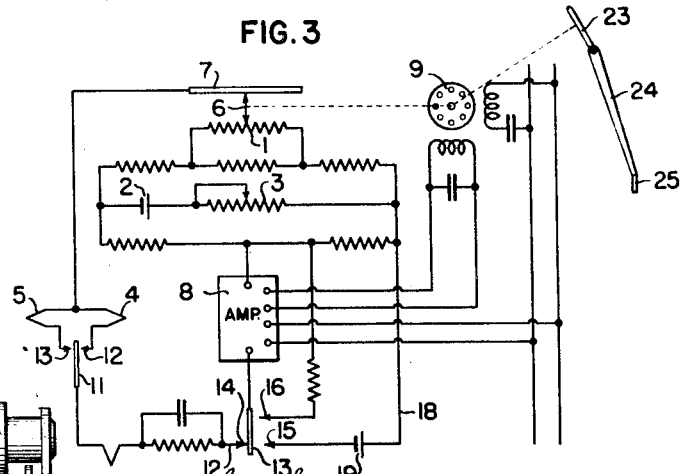
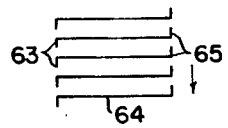
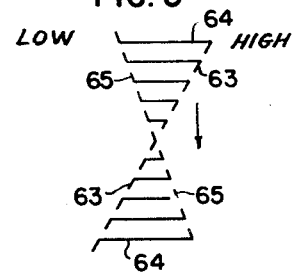
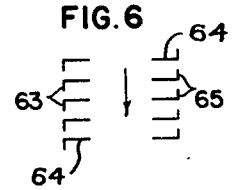
*INVENTOR.*
ARTHUR H. JORDAN
BY
*CB Spangenberg*
ATTORNEY Patented Mar. 21, 1950

2,501,604

UNITED STATES PATENT OFFICE 2,501,604

RECORDER HAVING A SINGLE MARKER FOR MAKING A PAIR DISTINGUISHABLE RECORDS

Arthur H. Jordan, Norristown, Pa., assignor, by mesne assignments, to Minneapolis-Honeywell Regulator Company, Minneapolis, Minn., a corporation of Delaware Application December 15, 1944, Serial No. 568,245

12 Claims. (Cl. 346—63)

The present invention relates to recording instruments and more particularly to a recording instrument in which a single marking element is used to make a record of a plurality of variable conditions such as pressure, temperature, liquid level, or speed.

In most recording instruments of the circular chart type in which a record is made of the value of more than one variable a separate marking element is used for each record. In some types of instruments, however, the same measuring system may be connected to more than one primary responsive element. In such a case it is desirable to use the same marking element to record the value of each of the conditions being measured. When this is done some means is provided so that the record of one condition may be distinguished from that of another.

It is an object of the invention to provide a recording instrument with a single marking element to record the value of a plurality of variable conditions. It is a further object of the invention to provide a means to adjust the marking element of a recording instrument so that distinct records may be made of the values of more than one condition.

It is a more specific object of the invention to provide a means to move the marking element of a recording instrument from a chart thereon, during the time that the measuring elements of the instrument are being disconnected from one responsive element and being connected to another.

It is a further object of the invention to provide a signal means that is synchronized with the instrument to indicate to an observer which one of the conditions is being measured at any given time.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Figure 2 is a view partly in section taken on line 2—2 of Figure 1;

Figure 3 is a diagrammatic wiring diagram of a potentiometer circuit; and

Figures 4 to 6 are views showing the types of chart record that may be obtained with the present instrument.

Figure 1:
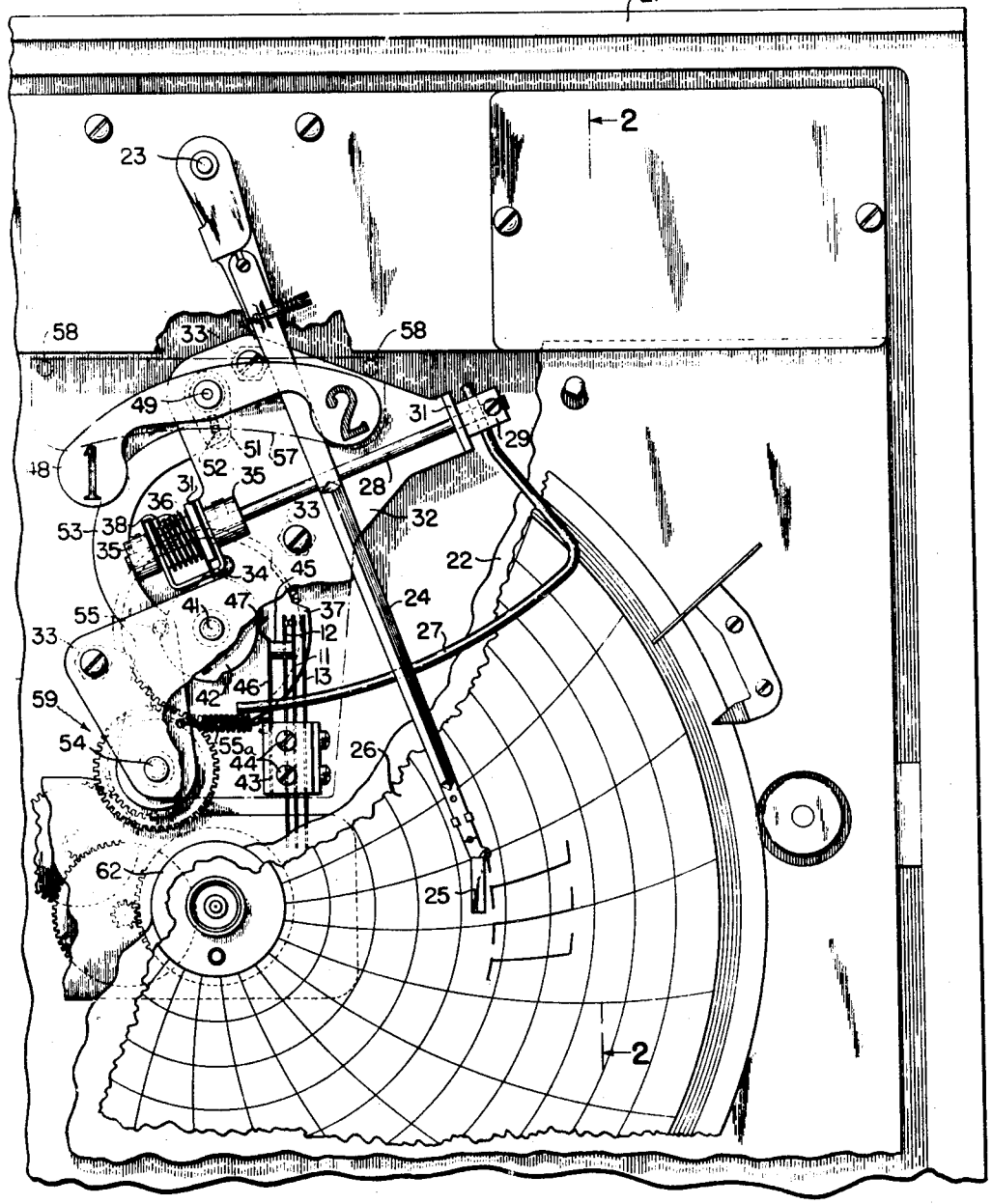
Figure 1 is a front view of a recording instrument showing the pen lifting mechanism.

Referring first to Figure 3 there is shown a typical potentiometer circuit in which there is a slide wire 1 that has a potential impressed across it by a battery 2 to produce a voltage drop, the battery preferably being in the form of a dry cell. Connected in circuit with the battery is a variable resistance 3 that is used to maintain constant the potential drop in the circuit as the battery diminishes in power in order to keep the system in calibration. The voltage from one or another of a plurality of thermocouples 4 and 5 is impressed across a portion of the slide wire 1 as determined by the position of a contact 6 along the slide wire and a parallel collector bar 7. As the temperature of the thermocouple which is then in the circuit changes, the potentiometer circuit will become unbalanced, and this in turn is detected by a vibrator and amplifier 8 to energize a motor 9 to shift the contact 6 along the slide wire in the proper direction and amount in order to rebalance the potentiometer circuit. The details of the vibrator and amplifier are disclosed in the copending application of Walter P. Wills, Serial No. 421,173, and which was filed on December 1, 1941 (now Patent 2,423,540).

One or the other of the thermocouples 4 and 5 may be connected in this circuit by movement of a leaf 11 of a thermocouple switch into engagement with either contact 12 or 13 respectively. The leaf 11 of this switch is connected by a wire 12a to another switch which consists of a movable contact 13a that is connected to the amplifier and a stationary contact 14 on the end of the wire 12a. This switch is also provided with a stationary contact 15 that is connected to the potentiometer network and a stationary contact 16 which is used to insert a shunt resistance around the amplifier at such times as the potentiometer circuit is being standardized. In a wire 18 between the contact 15 and the potentiometer network there is located a standard cell 19 which is used to impress a standard potential across a portion of the potentiometer network at such times as the network is being recalibrated or standardized.

In the operation of the potentiometer network of the type disclosed above, upon the occurrence of a change in temperature of a thermocouple, the potentiometer circuit will be unbalanced to produce a current flow in one direction or in the other through a vibrator which is included along with the amplifier and designated at 8. The vibrator and amplifier will detect this unbalance, its direction and amount, and correspondingly energize the motor 9 for rotation in the proper direction. This motor is mechanically connected in a suitable manner with the contact 6 so that the latter is shifted along the slide wire 1 and collector 7 to a position in which the potentiometer circuit is again balanced and no current flows through the unit 8. Means to be described below are provided to periodically move the switch leaf 11 into engagement with the contact 12 or contact 13 so that the instrument will periodically and alternately measure the temperature of thermocouples 4 and 5.

The potentiometer mechanism which has been described is mounted in a casing 21 and is protected in the front by a chart plate 22 that is detachably fastened to the casing. This chart plate 22 is shown as being broken away in order that the details of certain mechanism located behind the chart plate may be better shown. The motor 9 that is used to move the contact 6 along the slide wire 1 and the collector bar 7 also serves to move a shaft 23 an amount proportional to the position of the contact. Fastened to this shaft and extending downwardly in front of the chart plate is a pen arm 24 that has a pen 25 attached to its lower end. This pen moves across a chart 26 that is slowly rotated so that a record is made of the value of the temperature being measured.

The mechanism which serves to lift the pen arm and to operate the thermocouple switch is located in the instrument casing and behind the chart plate 22. The pen lifting portion of this mechanism includes a member 27 which has a horizontal portion extending under the pen arm in the direction of the pen travel and which is long enough to be under the pen arm at any point of its travel across the chart. One portion of this member is attached to a shaft 28 by means of an arm 29 that is best shown in Figure 2 of the drawing. The shaft 28 is journaled in bearings 31 that are formed by means of turned up portions of a supporting plate 32 that is in turn attached by spacer bolts 33 to the rear of the instrument casing 21. The left end of the shaft 28 has attached to it a cam follower arm 34. The arm 34 is located along the shaft 28 and the shaft is located in its bearings 31 by means of collars 35. The arm 34 has a cam roller 36 on its rear end which roller bears against the periphery of a cam 37 and is resiliently biased into this position by a spring 38. Cam 37 is attached to a hub 39 which is rotatable on a stud shaft 41 that projects from the rear face of the supporting plate 32. This hub also has on it a cam 42 which serves to operate the thermocouple switch 11, 13 and an indicator that shows which thermocouple 4 or 5 is connected to the potentiometer circuit.

The thermocouple switch is a conventional leaf type switch in which the leaves are made of a spring material and are mounted in a vertical position and insulated from each other. The leaves of the switch are fastened to a bracket 43 that is in turn attached to the rear face of the supporting plate 32 by means of screws 44. The leaf 11 of the switch is biased to the left so that its contact is normally in engagement with the contact of leaf 12 but may be moved to the right to bring its contact into engagement with the contact on the leaf 13. To this end the leaf 11 is provided with a button 45 that engages a spring member 46 which has on its free end a bent portion 47 that bears against the periphery of cam 42 and is shown in Figure 1 as bearing against the low portion thereof. Therefore as the cam rotates the spring 46 and, through the button 45, the leaf 11 will be moved from the position shown to the right to bring contacts of leaves 11 and 13 into engagement with each other.

In order to indicate which of thermocouples 4 or 5 is connected into the potentiometer circuit there is provided a swinging member 48 that is attached to a pivoted shaft 49 which shaft may rotate in a bushing 50 that projects forwardly from the supporting plate 32. The member 48 is provided on each of its ends with a numeral to indicate whether the first or the second record is being made. For example, as shown in the drawings, contacts 11 and 12 are in engagement with each other indicating that the thermocouple 4 is connected in the potentiometer circuit. When this is so the swinging member 48 is in a position so that the numeral 1 is indicating that the first record is being made.

Attached to the rear end of shaft 49 is a crank arm 51 that is provided with a slot which receives a pin 52 on the free end of a lever 53 that is pivoted at 54. This lever has projecting from it a cam roller 55 which engages the cam 42 at a point diametrically opposite the point at which this cam is engaged by portion 47 of the spring leaf 46. The lever 53 is normally biased in a clockwise direction in order to maintain the cam roller 54 in engagement with the cam 42 by means of a spring 55a that has one end attached to the lever 53 and its other end attached to the switch bracket 43. There is also provided a shield 57 that is supported in front of the chart plate by rods 58. This shield, as is shown, is so positioned that all of the swinging member 48 except one of its ends is hidden from view of an observer in front of the instrument. The ends have on them the above mentioned indicating numerals.

The cams 37 and 42 are driven by gearing 59 from a shaft 61 upon the front end of which a chart hub 62 is mounted. This shaft is driven at a suitable rate of speed from a conventional clock motor which may be such that the chart is rotated once every twenty-four hours and the cams once every twenty minutes.

In the operation of the device, assume that the parts are in the position shown in Figures 1 and 2 and that the cams 37 and 42 are rotated in a clockwise direction. At this time the instrument is connected to thermocouple 4 and the pen 25 is making a record of the value of the temperature to which that thermocouple is subjected. Immediately following this the cam 42 will have rotated to a position in which the leaf 11 of the thermocouple switch will be moved into engagement with leaf 13 so that the switch will disconnect the thermocouple 4 from the instrument and will connect the thermocouple 5 in its place. At the same time the opposite side of cam 42 will move the lever 53 in a counterclockwise direction to shift the swinging member 48 to a position in which its right end is moved below the shield 57 and its left end is hidden by this shield. The exposed numeral 2 on the swinging member then indicates to an observer that the temperature of the thermocouple 5 is being measured. As the instrument is switched from one thermocouple to the other the pen 25 will be rapidly moved either up scale or down scale depending upon the relative values of the temperatures being measured and will then continue to record the value of the temperature of the new thermocouple as the chart rotates slowly. At the end of five minutes, if the cams 37 and 42 are rotated every twenty minutes, the cam 42 will have rotated to a position in which the thermocouple 4 will again be connected into the potentiometer circuit. At this time the cam 37 will have rotated to a position in which one of its low portions is under the roller 36 so that the shaft 28 and the parts carried thereby will be rotated in a clockwise direction in Figure 2 of the drawing. Thereupon the pen 25 will be lifted from the chart at the time that the instrument is shifted from one thermocouple to the other. When this occurs the pen will again be moved to a position over the chart corresponding to the temperature of the new thermocouple, but as it is moved it will not be in engagement with the chart. The rotation of the cam is so timed that immediately after the pen assumes its new position the high portion of the cam 37 will again be moved under roller 36 to permit the pen to return into engagement with the chart. At the same time it will continue to record the value of the temperature to which the thermocouple then connected in the instrument is subjected.

Referring to the Figure 4 of the drawing and assuming that the chart is moving downwardly as indicated by the arrow and further assuming that the instrument is connected to the thermocouple 4 the pen will be making a record substantially straight and in the direction opposite to the movement of the chart as is shown at 63 beginning in the lower portion of that figure. Thereafter when the instrument is switched from thermocouple 4 to thermocouple 5 the pen will make a record radially of the chart as is shown by the lower horizontal line 64 in Figure 4. Following this a record will be made opposite to the direction of movement of the chart of the temperature of the thermocouple 5 as shown at 65. Subsequently when the instrument is switched back to thermocouple 4 the pen will be lifted above the chart and no record will be made at this time. Thereafter another downwardly extending mark 63 will be made to show the temperature of thermocouple 4. From an examination of the typical chart record which is shown in Figure 4 it will be seen that the record of the temperature of the thermocouple 4 can always be identified since it is below the horizontal line 64. In a like manner the temperature of the thermocouple 5 can always be identified since it is above the horizontal line. This holds true even though the temperature of the thermocouple 4 may exceed the temperature of the thermocouple 5 as is shown in Figure 5 of the drawing in which the record indicates that the temperature of thermocouple 4 is gradually rising while that of thermocouple 5 is gradually falling. After a period of time, the temperatures of these two thermocouples cross on the chart and the mark 63 which is below the horizontal line 64 appears at the right instead of at the left end of this line.

From the above it will be seen that the record of the temperatures of the two thermocouples may be very readily identified.

By shaping the cam 37 in a suitable manner the pen 25 may be lifted from the chart at different times and a record such as is shown in Figure 6 may be obtained. In this case the pen is lifted so that the line 64 is broken between the recording position for thermocouple 4 and the recording position for thermocouple 5. In this manner the temperature of the thermocouple 4 is always indicated by the vertical line of an angle forming a third or a fourth quadrant while the temperature of thermocouple 5 is always indicated by the vertical line of an angle forming a first or a second quadrant depending upon which temperature is higher.

In view of the above description it will be seen that I have provided a simple mechanism which permits a plurality of easily identified records to be made on a single chart. The cams 37 and 42 are rotated at such a speed that the records 63 and 65 are substantially continuous, and thus are able to show any normal fluctuations that may occur in the two temperatures that are being recorded. There is also provided a means to indicate which of these temperatures is being recorded at any time without the necessity of a close examination of the chart. This is important since an operator becomes accustomed to seeing from a distance the position of the pen arm in front of the chart to give him an approximate indication of the temperature being measured and at the same time he can see from the position of the member 48 which temperature it is.

While in accordance with the provisions of the statutes, I have illustrated and described the best forms of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is:

1. In a recording instrument of the type to make a record of the value of a plurality of variables and having a chart upon which the records are made, the combination of a recording element moved periodically to positions across the chart corresponding to the values of said variables, and means to lift positively said recording element above said chart as it is moving from a position corresponding to the value of one variable to a position corresponding to the value of another variable and to maintain said recording element in engagement with said chart at it is moving from a position corresponding to the value of said another variable to a position corresponding to the value of the said one variable.

2. In a recording instrument of a type to record the value of a plurality of variables and having a chart upon which the records are made, the combination of a single recording element to record the value of each variable on the chart, an element responsive to each variable whose value is to be recorded, means to connect alternately each responsive element to said instrument so that the recording element will alternately be moved to positions on the chart corresponding to the value of the variables, and means to lift positively said recording element from said chart as it moves from a position corresponding to the value of one variable to a position corresponding to the value of another variable, but not as the recording element is moving from a position corresponding to the value of the second mentioned variable to the first mentioned variable.

3. In a recording instrument of the type to record the value of a plurality of variables and having a chart upon which the records are made, the combination of a recording element, means to move said recording element periodically from a position across the chart in which it is recording the value of one variable to a position in which it is recording the value of another variable, and means to lift positively said recording element out of engagement with the chart only when it is going from one said position to the other in one direction.

4. In a recording instrument of a type in which a record is made of the values of a plurality of variable conditions and having a chart upon which the records are made, the combination of a plurality of condition responsive members, means to connect alternately said members to said instrument, a recording element, means to move said element to positions across the chart depending upon the value of the condition to which the responsive member then connected to the instrument is subjected, means to lift positively said recording element from the chart, and means to synchronize the operation of said connecting means and said lifting means so that said recording element is lifted from the chart when the instrument is disconnected from one responsive member and connected to another responsive member, and operative to maintain the recording element in engagement with the chart when the instrument is disconnected from said second mentioned responsive member and connected to said first mentioned responsive member.

5. In a multiple recording instrument having a chart upon which records are to be made, the combination of a plurality of condition responsive elements, an arm, mechanism operative to move said arm to positions corresponding to the value of the condition to which the responsive element then connected to the mechanism is subjected, switch means to connect alternately said responsive elements to said mechanism, a recording element carried by said arm and operative to make a record on the chart, means to engage said arm to lift said arm and thereby move said recording element out of engagement with the chart, operating means for said means to engage, and cam means to actuate said switch and said operating means, said cam means being so shaped that said pen will remain in engagement with the chart as it is moving from a position dictated by one responsive element to a position dictated by another and will be lifted from said chart as it is moving in the opposite direction.

6. In a recorder having a rotatable circular chart for receiving distinguishable markings representing successive values of two different variables, the combination including, a motor for rotating said chart, a recorder mounted for movement substantially radially of said chart to a position directed by the momentary value of either one of said variables which is directing said recorder, and a motor mechanism lifting said recorder out of engagement with said chart during the movement of said recorder from its position as dictated by one of said variables to its position dictated by the other of said variables but inoperative to lift said recorder during its movement in the opposite direction.

7. In an instrument for recording the successive values of a pair of variables and having a rotatable circular chart upon which the records are made, the combination including, a motor for rotating said chart, a recording element movable periodically from a position in engagement with the chart recording the value of one variable to a position in engagement with the chart recording the value of another variable, and motor operated mechanism to lift positively said recording element out of engagement with the chart only when it is going from one of said positions to the other of said positions in one direction, said recorder making a mark substantially radially of said chart during the movement of said recorder in the opposite direction.

8. In an instrument for recording on a rotating circular chart the successive instantaneous values of a pair of variables by means of distinguishable markings, the combination including, a motor driving said chart in rotation, a recording element, a pair of measuring elements each adapted to measure the instantaneous values of one of said variables and to govern the movement of said recording element to a position corresponding to said instantaneous value, a switch for disconnecting said recording element from one of said measuring elements and for connecting said recording element to the other of said measuring elements, and a periodically motor-operated mechanism holding said recording element out of engagement with said chart during the movement of said recording element from one of said recording positions to the other, said periodic mechanism being inoperative to lift said recording element during the movement of said recording element in the opposite direction.

9. Apparatus for producing on a single rotatable circular chart individual distinguishable records of the values of a pair of variables as measured by a pair of measuring elements each responsive to the instantaneous values of one of said variables, including, a motor for rotating said chart, a recorder biased for normal engagement with said chart so as normally to make a circumferential record on said chart, a periodically operated switch for connecting said recorder to one of said measuring elements and for disconnecting said recorder from the other of said measuring elements and vice versa, and a cyclically operating power driven device lifting said recorder out of engagement with said chart during the movement of said recorder in one direction only from the position in which said recorder records the value of one of said variables to the position in which said recorder records the value of the other of said variables.

10. In an instrument having a rotatable circular chart for receiving distinguishable markings alternately recording successive values measured by a pair of measuring instruments, the combination including, an electric motor having a range of movement corresponding to the range of change of said values and having positions of rest corresponding to the instantaneous value of each of said variables an electric switch alternately connecting one of said measuring instruments to said motor and disconnecting the other of said measuring instruments from said motor, a single recorder driven by said electric motor to positions of rest corresponding to the value measured by that measuring instrument connected to said motor, and a periodically operated motor rotating said chart and lifting said recorder out of contact with said chart during the whole of the time during which said recorder is moving in one direction from one position of rest to the other position of rest and inoperative to lift said recorder during the movement of said recorder from said other position of rest to said one position of rest.

11. In an instrument having a chart for receiving distinguishable markings alternately recording successive values measured by a pair of measuring elements, the combination including, an electric motor having a range of movement corresponding to the range of change of said values and having positions of rest corresponding to each of said values, an electric switch alternately connecting each of said measuring elements to said electric motor and simultaneously alternately disconnecting the other of said measuring instruments from said motor, a single recorder driven by said motor to positions of rest corresponding to the value measured by that measuring element connected to said motor, a second motor periodically operating said switch, and a linkage forming the driving connection from said second motor to said recorder and having a cylic operation such that said recorder is held in contact with the chart during at least a portion of each of the times during which said electric motor is at rest to mark said chart corresponding to the value measured by that measuring element which is connected to said electric motor at that time and at least a portion of the time during which said electric motor is moving from one position of rest to its other position of rest to thereby distinguish between said marks and such that said recorder is held out of contact with said chart during the whole of the time during which said electric motor is moving from said other position of rest to said one position of rest.

12. A device for recording successive values of a plurality of variables as measured by a plurality of measuring elements which are connected in succession to the device, the combination including, a potentiometer circuit connected to each of the measuring elements in succession and unbalanced by any change measured by that measuring element which is connected to said potentiometer circuit, an electric motor connected into said potentiometer circuit so as to be energized as long as any unbalance of said potentiometer circuit exists, an adjustable resistor connected into said potentiometer circuit and adjustable by said motor to rebalance said potentiometer circuit, an electric switch arranged to connect one of said measuring elements to said potentiometer circuit and to disconnect the other of said measuring elements from said potentiometer circuit and then to disconnect said one of said measuring elements from and to connect said other of said measuring elements to said potentiometer circuit, recording means operative to make a record of the value measured by each of said measuring elements while connected to said potentiometer circuit and operative to make a record during at least a portion of the time during which said recording means moves from the position to which it is moved in response to the value measured by said one of said measuring elements to the position to which it is moved in response to the value measured by said other of said measuring elements, and a cam rendering said recording means inoperative to make a record during the whole of the time during which said recording means moves from the position to which it is moved in response to the value measured by said other of said measuring elements to the position to which it is moved in response to the value measured by said one of said measuring elements.

ARTHUR H. JORDAN.

REFERENCES CITED

The following references are of record in the file of this patent:

UNITED STATES PATENTS

| Number | Name | Date |
| --- | --- | --- |
| 1,046,680 | Thwing | Dec. 10, 1912 |
| 1,085,511 | Thwing | Jan. 27, 1914 |
| 1,350,174 | Norwood et al. | Aug. 17, 1920 |
| 1,471,129 | Holt | Oct. 16, 1923 |
| 1,782,525 | Allen | Nov. 25, 1930 |
| 1,811,417 | Bristol | June 23, 1931 |
| 2,118,081 | Grisdale | May 24, 1938 |
| 2,152,333 | Spitzglass et al. | Mar. 28, 1939 |
| 2,277,427 | Woodson | Mar. 24, 1942 |

FOREIGN PATENTS

| Number | Country | Date |
| --- | --- | --- |
| 235,781 | Germany | June 20, 1911 |